E. JOHNSON.
Buck-Board.
No. 224,338. Patented Feb. 10, 1880.
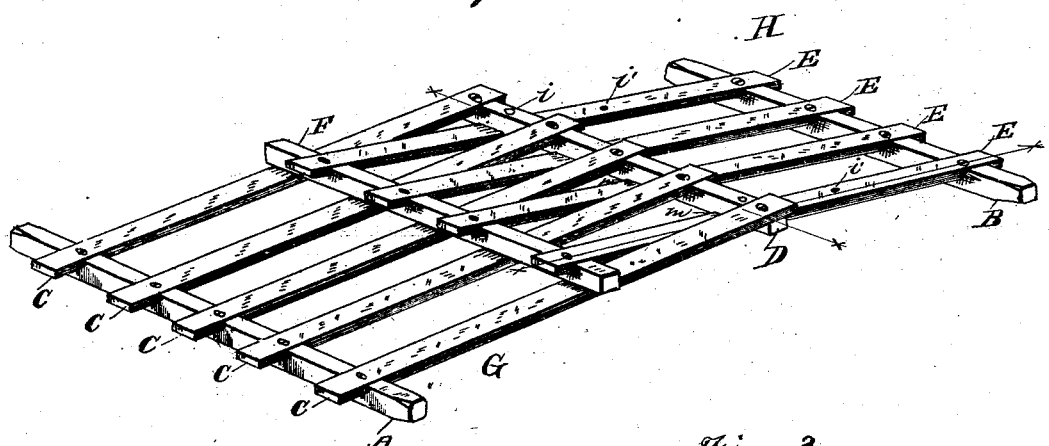
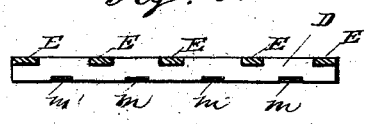
Attest,
W. H. H. Knight
W. Blackstock
Inventor,
Elmore Johnson
by L. Hill
His Atty.

UNITED STATES PATENT OFFICE.

ELMORE JOHNSON, OF MORRISVILLE, VERMONT.

BUCKBOARD.

SPECIFICATION forming part of Letters Patent No. 224,338, dated February 10, 1880.

Application filed November 17, 1879.

*To all whom it may concern:*

Be it known that I, ELMORE JOHNSON, of Morrisville, in the county of Lamoille and State of Vermont, have invented a certain new and Improved Buckboard for Wagons; and I do hereby declare the following to be a full, clear, and exact description of the same, reference being had to the accompanying drawings, forming part of this specification, in which—

Figure 1 is a perspective view; Fig. 2, a longitudinal sectional view, and Fig. 3 a sectional view on the line $x\ x$.

Similar letters of reference in the accompanying drawings denote the same parts.

The object of this invention is to improve the construction and operation of buckboard-wagons, so as to prevent the sagging of the buckboard, keep the spring at all times above the plane of the axles, enable the buckboard to be made longer or shorter at pleasure, adapt the wagon to be adjusted for light or heavy loads, and enable the wagon to be turned in a smaller space. These results are accomplished by constructing the buckboard of a series of longitudinal spring-slats and transverse cross-bars, substantially as I will now proceed to describe.

In the drawings, A is the rear axle, and B the front rocker or bolster or a bar to be attached or connected thereto.

C C are a series of longitudinal and parallel spring-slats, secured at their rear ends to the axle A, and at their front ends to a cross-bar, D.

E E are a series of longitudinal parallel spring-slats, secured at their front ends to the rocker or bar B, and at their rear ends to a cross-bar, F.

Each series of longitudinal slats, with its cross-bar, thus forms a slat-frame, and for the purpose of this description I will designate the rear slat-frame by the letter G and the forward slat-frame by the letter H. The two frames are interlocked, so that the cross-bar D rests upon the top of the slats E, while the cross-bar F rests upon the top of the slats C, as shown.

The cross-bar F is somewhat longer than the cross-bar D, so that its ends will bear upon the outside slats of the frame G.

The slats and their supports may be secured together in any approved manner. The two frames thus interlocked constitute a species of arched buckboard, and the body of the vehicle may rest directly upon the upper part of the arch, or upon any suitable support which rests above that part of the arch.

It will be seen that the buckboard thus constructed can be easily lengthened or shortened by sliding the two frames upon each other, so as to cause the parts A and B to recede from or approach each other.

It will also be seen that the frame thus longitudinally adjustable can be secured at any desired length by fastening the cross-bars D F, or either of them, rigidly to the slats upon which they rest by means of bolts, clips, or other suitable fastenings. I have shown the mode of securing them together by means of bolts at $i$ in the drawings, said bolts being adapted to enter recesses or holes $i'$ in the opposite frame. A single set of bolts in one cross-bar, with a series of holes in the opposite frame, will answer to adjust at several different lengths.

In order to properly guide and hold the bars properly in position I have recessed the under side of each movable cross-bar, as shown at $m$, the recesses being adapted to fit over and around the upper edge of the cross-bars, so as to partially countersink them therein and furnish lateral guides on both sides.

A series of bolts or staples, or their equivalents, projecting down from the two movable cross-bars so that the slats may work between or through them, will answer the same purpose.

Having thus described my invention, I claim as new—

1. In a wagon or other vehicle, a buckboard consisting of two slat-frames interlocked so that the cross-bar at one end of each frame bears on the longitudinal bars of the other frame, substantially as described.

2. In a wagon or other vehicle, a buckboard consisting of two slat-frames interlocked, substantially as described, and rendered adjustable, for the purpose specified.

3. In a wagon or other vehicle, a buckboard consisting of two interlocked and adjustable slat-frames, which are capable of being secured rigidly together at different points of adjustment.

4. In a wagon or other vehicle, the combination of the guides $m$, or their equivalent, with the cross-bars and slats of the two frames of the buckboard.

ELMORE JOHNSON.

Witnesses:
J. A. BUNDY,
GEO. W. HENDEE.